(12) United States Patent
Fu et al.

(10) Patent No.: US 9,077,255 B2
(45) Date of Patent: Jul. 7, 2015

(54) RESONANT CONVERTERS AND METHODS

(71) Applicant: FutureWei Technologies, Inc., Plano, TX (US)

(72) Inventors: Dianbo Fu, Plano, TX (US); Wensong Yu, Blacksburg, VA (US); Hengchun Mao, Plano, TX (US); Heping Dai, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 162 days.

(21) Appl. No.: 13/739,920

(22) Filed: Jan. 11, 2013

(65) Prior Publication Data

US 2014/0198536 A1  Jul. 17, 2014

(51) Int. Cl.
*H02M 3/335* (2006.01)
*H02M 3/337* (2006.01)
*H02M 7/487* (2007.01)
*H02M 7/48* (2007.01)

(52) U.S. Cl.
CPC ...... *H02M 3/33546* (2013.01); *H02M 3/33576* (2013.01); *H02M 3/3376* (2013.01); *H02M 7/487* (2013.01); *H02M 2007/4815* (2013.01); *Y02B 70/1433* (2013.01); *Y02B 70/1441* (2013.01)

(58) Field of Classification Search
CPC . H02M 1/32; H02M 3/33569; H02M 3/3376; H02M 3/3338; H02M 3/33593; H02M 7/537; H02M 7/5387; Y02B 70/433; Y02B 70/1433; Y02B 70/1441; Y02B 70/1475

USPC ............ 363/16, 17, 21.02, 21.03, 21.06, 125, 363/131, 132
See application file for complete search history.

(56) References Cited

U.S. PATENT DOCUMENTS

| | | | |
|---|---|---|---|
| 5,414,238 A * | 5/1995 | Steigerwald et al. ..... | 219/121.54 |
| 6,930,893 B2 * | 8/2005 | Vinciarelli ...................... | 363/17 |
| 7,796,406 B2 * | 9/2010 | Lev ................................ | 363/21.02 |
| 7,800,921 B2 * | 9/2010 | Zhu et al. ...................... | 363/17 |
| 8,031,489 B2 * | 10/2011 | Wang et al. .................. | 363/21.06 |
| 8,536,735 B2 * | 9/2013 | Yan et al. ...................... | 307/77 |
| 2007/0091649 A1 * | 4/2007 | Vinciarelli .................... | 363/16 |
| 2009/0034299 A1 * | 2/2009 | Lev ................................ | 363/17 |
| 2009/0244934 A1 * | 10/2009 | Wang et al. .................. | 363/21.06 |
| 2009/0290385 A1 * | 11/2009 | Jungreis et al. ............... | 363/17 |
| 2011/0292688 A1 * | 12/2011 | Zhang et al. ................ | 363/21.02 |
| 2013/0265804 A1 * | 10/2013 | Fu et al. ........................ | 363/17 |
| 2014/0119060 A1 * | 5/2014 | Zhu et al. ...................... | 363/17 |

OTHER PUBLICATIONS

Fu, D., et al., "1MHz High Efficiency LLC Resonant Converters with Synchronous Rectifier," Center for Power Electronics Systems, Conference Publications, Jun. 17-21, 2007, pp. 2404-2410.

* cited by examiner

*Primary Examiner* — Adolf Berhane
(74) *Attorney, Agent, or Firm* — Slater & Matsil, L.L.P.

(57) ABSTRACT

A multilevel LLC resonant converter comprises a resonant tank connected in series with a primary side of a transformer, a first switch and a second switch connected in series, wherein a common node of the first switch and the second switch is coupled to a mid-voltage point through a first isolation switch and the resonant bank and a third switch and a fourth switch connected in series, wherein a common node of the third switch and the fourth switch is coupled to the resonant tank.

20 Claims, 11 Drawing Sheets

RESONANT CONVERTERS AND METHODS

TECHNICAL FIELD

The present invention relates to resonant converters and methods, and more particularly, to multilevel inductor-inductor-capacitor (LLC) resonant converters.

BACKGROUND

A telecommunication network power system usually includes an AC-DC stage converting the power from the AC utility line to a 48V DC distribution bus and a DC-DC stage converting the 48V DC distribution bus to a plurality of voltage levels for all types of telecommunication loads. Both stages may comprise isolated DC-DC converters. Isolated DC-DC converters can be implemented by using different power topologies, such as flyback converters, forward converters, half bridge converters, full bridge converters and the like. As known in the art, bridge converters generally are employed when the power of a DC-DC converter is more than 100 watts.

FIG. 1 (prior art) illustrates a conventional full bridge converter having a full wave rectifier coupled to a center-tapped secondary winding. The full bridge converter 100 includes four switches Q1, Q2, Q3 and Q4 at a primary side of a transformer Tx. The four switches Q1, Q2, Q3 and Q4 form a bridge having two legs. Q1 and Q3 in series connection have a common node, referred to as A. Q2 and Q4 in series connection have a common node, referred to as B. The primary winding of the transformer Tx is connected to A and B. A dc supply Vin is connected to the two legs to provide power to the full bridge converter 100.

According to the operating principle of a hard switching full bridge converter, the switches Q1 and Q4 are turned on simultaneously for an adjustable time during a first half cycle. After a period of dead time, the switches Q2 and Q3 are turned on simultaneously for an equal time during the second half cycle. As a result, Vin and −Vin are applied to the primary side of the transformer Tx in alternate half periods.

In a fixed duty cycle control scheme, the turn-on time of the switches Q1 and Q4 is equal to the turn-on time of the switches Q2 and Q3. When all four switches are turned off, both S1 and S2 are turned on. The load current flows through S1 and S2. This interval is referred to as a freewheeling period. The output voltage of the bridge converter 100 is proportional to the turn-on time of the switches. A controller (not shown) may detect the output voltage V0 and adjust the turn-on time via a negative feedback control loop (not shown).

The secondary side of the transformer Tx is center-tapped. Such a center-tapped secondary and two switches S1 and S2 can form a full wave rectifier, which can convert the primary voltage having double polarities (Vin and −Vin) of the transformer Tx to a secondary voltage having a single polarity. Then, the secondary voltage having a single polarity is fed to an output filter including an inductor Lo and an output capacitor Co. The output filter averages the square voltage pulses at the output of the full wave rectifier and generates a DC voltage at Vo, which is then supplied to a load represented by a resistor $R_L$.

A phase shift full bridge converter is capable of reducing switching losses by means of the zero voltage switching control technique. As shown in a dashed rectangle 120 of FIG. 1, instead of turning on two primary switches (e.g., Q1 and Q4) simultaneously, the turn-on time of these two switches are shifted by a period of time. More particularly, as depicted in the dashed rectangle 120, a waveform 106 and a waveform 110 show Q1 is on for a period of time before Q4 is turned on. There is an overlap between Q1's turn-on time and Q4's turn-on time. After Q1 is turned off, Q4 stays on for a period of time. Likewise, a waveform 107 and a waveform 111 show there is a phase shift between Q2 and Q3's turn-on time.

The phase shift full bridge can achieve zero voltage switching by utilizing the L-C resonance between transformer leakage inductance and MOSFET (e.g., Q1) output capacitance. For example, Q3 has a parasitic capacitor (not shown) across its drain and source. During the period when both Q1 and Q4 are on, the voltage across Q3's parasitic capacitor is charged to a voltage approximately equal to Vin. According to the basic principle of the phase shift control technique, Q1 is off prior to Q4. After Q1 is off, the primary side current cannot change instantaneously. As a result, the primary side current will flow through the parasitic capacitors of Q1 and Q3. The flow of the primary side current through both parasitic capacitors may cause the voltage at the junction between Q1 and Q3 to be discharged to zero, enabling zero voltage switching when Q3 is turned on without substantial power losses. Similarly, the phase shift operation may enable a lossless turn-on process of other switches, namely Q1, Q2 and Q4.

SUMMARY OF THE INVENTION

These and other problems are generally solved or circumvented, and technical advantages are generally achieved, by preferred embodiments of the present invention which provide a system, apparatus and method for improving efficiency of a multilevel LLC resonant converter in a wide input voltage range.

In accordance with an embodiment, an apparatus comprises a first capacitor and a second capacitor connected in series providing a mid-voltage point of an input dc power source, a resonant tank connected in series with a primary side of a transformer, a first switch and a second switch connected in series, wherein a common node of the first switch and the second switch is coupled to a mid-voltage point through a first isolation switch and the resonant tank and a third switch and a fourth switch connected in series, wherein a common node of the third switch and the fourth switch is coupled to the resonant tank.

In accordance with an embodiment, a system comprises an input power source, a first capacitor and a second capacitor connected in series across the input power source, a first pair of switches coupled between the input power source, wherein a common node of the first pair of switches is coupled to a common node of the first capacitor and the second capacitor through a first isolation switch, a second pair of switches coupled between the input power source, a resonant tank connected in series with a primary side of a transformer to form a resonant network, wherein the common node of the first pair of switches is coupled to a first terminal of the resonant network and a common node of the second pair of switches is coupled to a second terminal of the resonant network, a synchronous rectifier coupled to a secondary side of the transformer and an output filter coupled to the synchronous rectifier.

In accordance with another embodiment, a method comprises during a first time duration, coupling a first input of a resonant network to a positive terminal of an input power source and a second input of the resonant network to a negative terminal of the input power source, during a second time duration, coupling the first input of the resonant network to a common node of two capacitors coupled between the input power source and the second input of the resonant network to the negative terminal of the input power source.

The method further comprises during a third time duration, coupling the first input of the resonant network to the negative terminal of the input power source and the second input of the resonant network to the positive terminal of the input power source and during a fourth time duration, coupling the first input of the resonant network to the common node of the two capacitors coupled between the input power source and the second input of the resonant network to the positive terminal of the input power source.

An advantage of a preferred embodiment of the present invention is reducing the switching losses of a multilevel LLC resonant converter so as to improve the multilevel LLC resonant converter's efficiency.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a three-level LLC resonant converter. The invention may also be applied, however, to a variety of multilevel converters including three-level converters, five-level converters, seven-level converters and the like.

Figure 2:
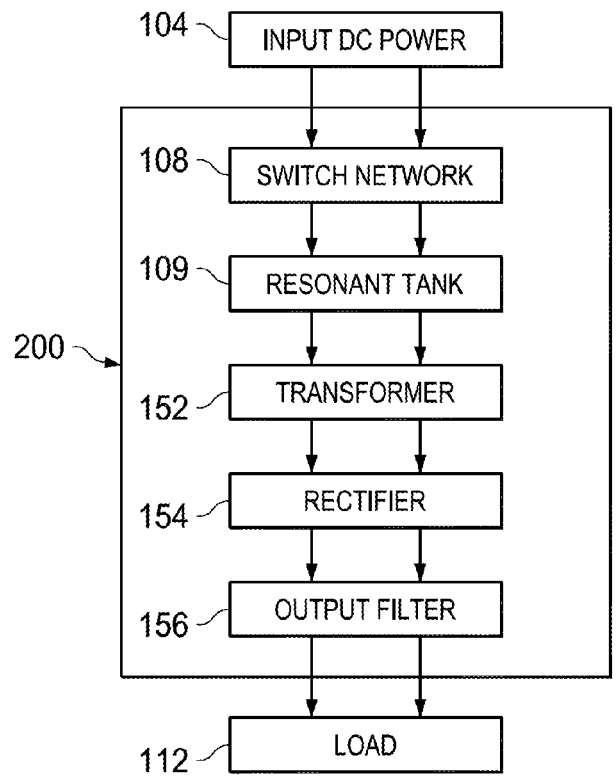
FIG. 2 illustrates a block diagram of a LLC multi-level converter in accordance with various embodiments of the present disclosure.

FIG. 2 illustrates a block diagram of a multilevel LLC resonant converter in accordance with various embodiments of the present disclosure. The multilevel LLC resonant converter 200 is coupled between an input dc power source 104 and a load 112. The input dc power source 104 may be telecommunication power supplies converting a utility line voltage to a dc voltage. Alternatively, the input dc power source 104 may be a solar panel array. Furthermore, the input dc power source 104 may be an energy storage device such as rechargeable batteries, fuel cells and/or the like. The load 112 represents the power consumed by a circuit coupled to the multilevel LLC resonant converter 200. Alternatively, the load 112 may refer to downstream converters coupled to the output of the multilevel LLC resonant converter 200.

The multilevel LLC resonant converter 200 may comprise a switch network 108, a resonant tank 109, a transformer 152, a rectifier 154 and an output filter 156. As shown in FIG. 2, the switch network 108, the resonant tank 109, the transformer 152, the rectifier 154 and the output filter 156 are coupled to each other and connected in cascade between the input dc power source 104 and the load 112.

The switch network 108 may comprise primary side switches of a three-level resonant converter according to some embodiments. Alternatively, the switch network 108 may be of the primary side switches of other multilevel converters such as a five-level resonant converter, a seven-level resonant converter and the like. The detailed configuration of the switch network 108 will be described below with respect to FIG. 3.

The resonant tank 109 may be implemented in a variety of ways. For example, the resonant tank 109 may comprise a first resonant inductor, a resonant capacitor and a second resonant inductor. The first resonant inductor may be implemented as an external inductor. Alternatively, the first resonant inductor may be implemented as a leakage inductance of the transformer 152. The second resonant inductor may be implemented as a separate inductor connected in parallel with the primary side winding of the transformer 152. Alternatively, the second resonant inductor may be implemented as a magnetizing inductance of the transformer 152.

The resonant tank described above includes two inductors and a capacitor. Such a configuration is commonly known as an LLC resonant converter. According to the operating principle of LLC resonant converters, the resonant tank 109 helps to achieve zero voltage switching for the primary side switching elements and zero current switching for the secondary side switching elements.

The multilevel LLC resonant converter 200 may further comprise a transformer 152, a rectifier 154 and an output filter 156. The transformer 152 provides electrical isolation between the primary side and the secondary side of the multilevel LLC resonant converter 200. In accordance with an embodiment, the transformer 152 may be formed of two transformer windings, namely a primary transformer winding and a secondary transformer winding. Alternatively, the transformer 152 may have a center tapped secondary so as to have three transformer windings including a primary transformer winding, a first secondary transformer winding and a second secondary transformer winding. It should be noted that the transformers illustrated herein and throughout the description are merely examples, which should not unduly limit the scope of the claims. One of ordinary skill in the art would recognize many variations, alternatives, and modifications. For example, the transformer 108 may further comprise a variety of bias windings and gate drive auxiliary windings.

The rectifier 154 converts an alternating polarity waveform received from the output of the transformer 152 to a single polarity waveform. When the transformer 152 is of a center tapped secondary, the rectifier 154 may be formed of a pair of switching elements such as n-type metal oxide semiconductor (NMOS) transistors. Alternatively, the rectifier 154 may be formed of a pair of diodes. On the other hand, when the transformer is of a single secondary winding, the rectifier 154 may be a bridge rectifier coupled to the single secondary winding of the transformer 152.

Furthermore, the rectifier 154 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices and the like. The detailed operation and structure of the rectifier 154 are well known in the art, and hence are not discussed herein.

The output filter 156 is used to attenuate the switching ripple of the multilevel LLC resonant converter 200. According to the operation principles of isolated dc/dc converters, the output filter 156 may be an L-C filter formed by an inductor and a plurality of capacitors. One person skilled in the art will recognize that some isolated dc/dc converter topologies such as forward converters may require an L-C filter. On the other hand, some isolated dc/dc converter topologies such as LLC resonant converters may include an output filter formed by a capacitor. One person skilled in the art will further recognize that different output filter configurations apply to different power converter topologies as appropriate. The configuration variations of the output filter 156 are within various embodiments of the present disclosure.

Figure 3:
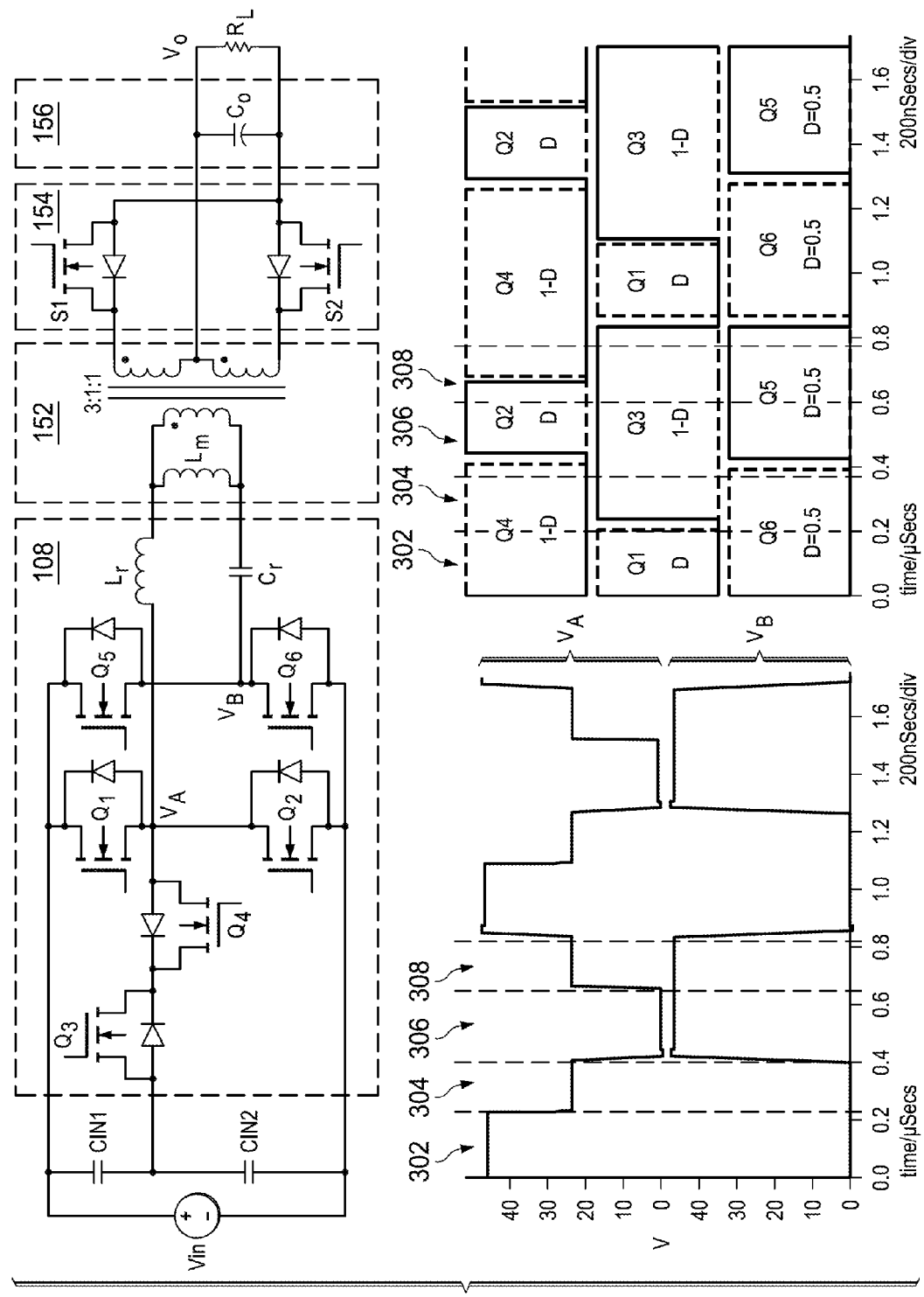
FIG. 3 illustrates a schematic diagram of the multi-level LLC converter shown in FIG. 2 in accordance with various embodiments of the present disclosure.

FIG. 3 illustrates a schematic diagram of the multilevel LLC resonant converter shown in FIG. 2 in accordance with various embodiments of the present disclosure. In order to filter input noise as well as provide a mid-voltage point, input capacitors are coupled between the two output terminals of the input voltage source Vin. More particularly, the input capacitors may comprise a first input capacitor CIN1 and a second input capacitor CIN2. The first input capacitor CIN1 and the second input capacitor CIN2 are connected in series across the input power source Vin.

The common node of the first input capacitor CIN1 and the second input capacitor CIN2 has a voltage potential approximately equal to one half of the input voltage Vin. Throughout the description, the common node of the first input capacitor CIN1 and the second input capacitor CIN2 is alternatively referred to as the mid-point of the multilevel LLC resonant converter. Likewise, the voltage at the mid-point is alternatively referred to as the mid-point voltage.

The switch network 108 includes six switching elements, namely Q1, Q2, Q3, Q4, Q5 and Q6. As shown in FIG. 3, a first pair of switching elements Q1 and Q2 connected in series. A second pair of switching elements Q5 and Q6 are connected in series. The common node of the switching elements Q1 and Q2 are coupled to the mid-point through an isolation device formed by back-to-back connected switching elements Q3 and Q4. In addition, the common node of the switching elements Q1 and Q2 are coupled to the resonant inductor Lr. The back-to-back connected switching elements Q5 and Q6 are capable of completely isolating the common node of the switching elements Q1 and Q2 from the midpoint.

The common node of the switching elements Q5 and Q6 are coupled to the resonant capacitor Cr. The resonant capacitor Cr, the resonant inductor Lr and the magnetizing inductance Lm form a resonant tank, which is coupled to the primary side of the transformer 152. According to some embodiments, switching elements Q1, Q2, Q3, Q4, Q5 and Q6 are implemented as MOSFET or MOSFETs connected in parallel.

It should be noted that the voltage stress on Q1, Q2, Q5 and Q6 is approximately equal to Vin. The voltage stress on Q3 and Q4 is approximately equal to one half of the input voltage Vin. In a telecommunication application, the max input voltage is about 75V in normal operation. Therefore, Q1, Q2, Q5 and Q6 may be implemented as 100V MOSFETs. Q3 and Q4 may be implemented as 60V MOSFETs. By employing 60V MOSFETs, the isolation device formed by Q3 and Q4 may be of a lower conduction loss because the on resistance of a 60V MOSFET is lower than that of a 100V MOSFET.

According to alternative embodiments, the primary switches (e.g., switch Q1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices and the like. The detailed operation principles of the switch network 108 will be described below with respect to FIGS. 4-7.

It should be noted that while the example throughout the description is based upon a three-level LLC resonant converter, the multilevel LLC resonant converter 200 shown in FIG. 2 may have many variations, alternatives, and modifications. For example, additional switching elements may be employed to achieve an output waveform having additional voltage levels. The three-level resonant converter illustrated herein is limited solely for the purpose of clearly illustrating the inventive aspects of the various embodiments. The present invention is not limited to any specific number of voltage levels.

Figure 1:
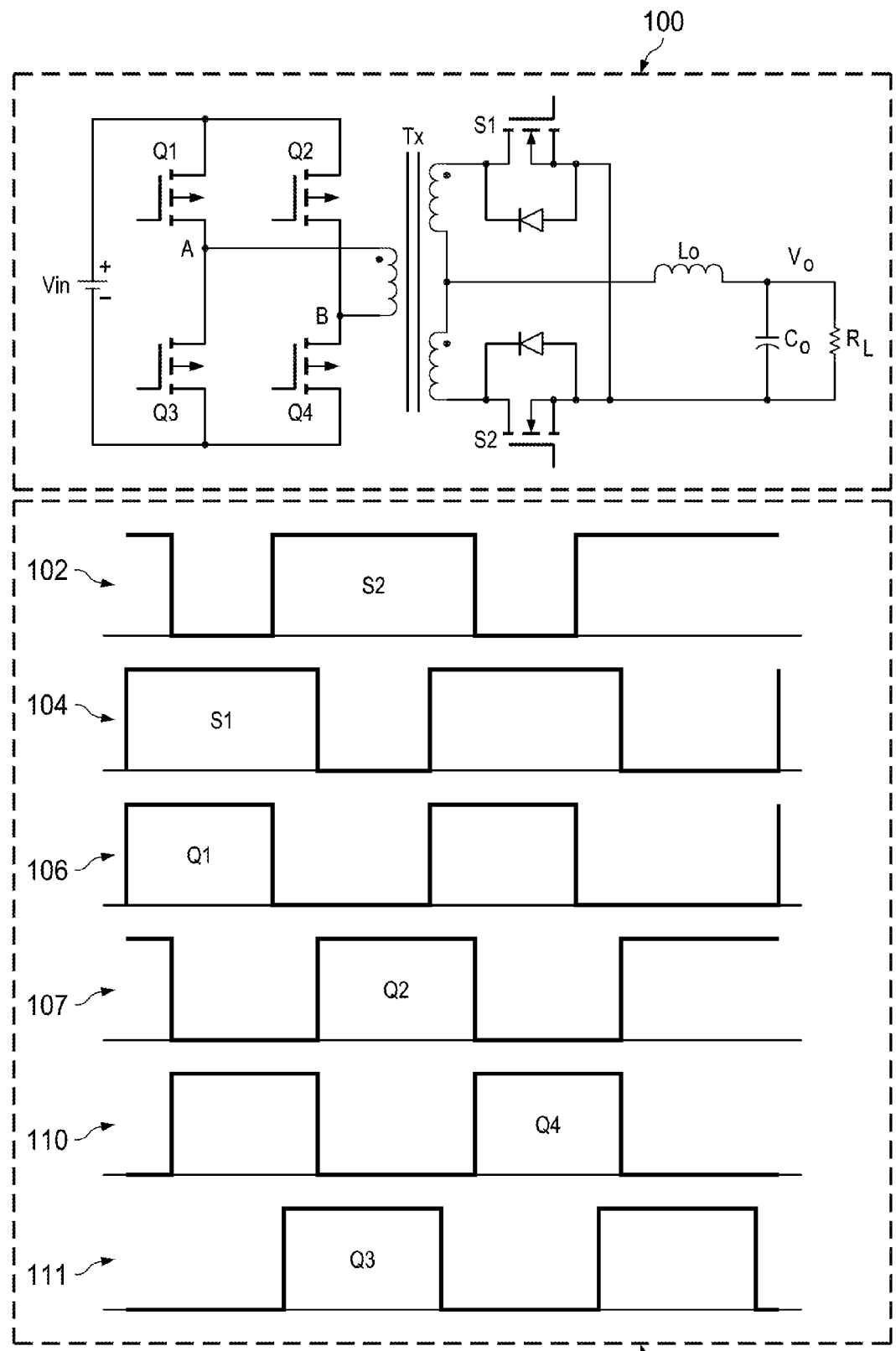
FIG. 1 illustrates a full bridge converter having a full wave rectifier coupled to a center-tapped secondary winding.

FIG. 3 shows that the resonant tank is formed by the resonant inductor Lr, the resonant capacitor Cr and the magnetizing inductance Lm. As shown in FIG. 3, the resonant inductor Lr is connected in series with the primary side of the transformer 152. Likewise, the resonant capacitor Cr is connected in series with the primary side of the transformer 152. The magnetizing inductance Lm may be utilized in combination with Lr and Cr to achieve ZVS for the primary side switching elements and ZCS for the secondary side switching elements. In addition, the magnetizing inductor as part of the resonant tank not only participate the resonant process, but also modifies the voltage gain of the LLC converter. As a result, the voltage gain of the LLC converter shown in FIG. 1 can be higher or lower than 1 by selecting suitable magnetizing inductances.

It should be noted while FIG. 3 shows the resonant inductor Lr is an independent component, the resonant inductor Lr may be replaced by the leakage inductance of the transformer 152. In other words, the leakage inductance (not shown) may be utilized as part of the resonant inductor Lr. Alternatively, the leakage inductance may be utilized to replace the resonant inductor Lr.

The transformer 152 is a center tapped transformer coupled between the primary side switching network and the second side switching network. The primary side switching network includes six switches, which have been described in detail above. The secondary side employs a synchronous rectifier formed by switches S1 and S21. The operation principle of a synchronous rectifier coupled to a center tapped transformer secondary side is well known, and hence is not discussed in further detail herein.

It should be noted that the power topology of the multilevel LLC resonant converter may be not only applied to a transformer having a center-tapped secondary winding as shown in FIG. 3, but also applied to a transformer having a non center-tapped secondary winding. Furthermore, the power topology of the multilevel LLC resonant converter is applicable to multilevel converters having other secondary configurations, such as voltage doubler rectifiers and current doubler rectifiers.

FIG. 3 further illustrates switching waveforms of the multilevel LLC resonant converter according to various embodiments of the present disclosure. As shown in FIG. 3, Q1 and Q2 are connected in series. The common node of Q1 and Q2 is referred to as $V_A$. Likewise, Q5 and Q6 are connected in series. The common node of Q5 and Q6 is referred to as $V_B$. The primary winding of the transformer 152 is connected to $V_A$ and $V_B$ through the resonant bank formed by Lr and Cr.

The switching waveforms include the voltages of node $V_A$ and node $V_B$. The upper waveform is the voltage at node $V_A$. The bottom waveform is the voltage at node $V_B$. In a switching period, according to the voltage levels at node $V_A$ and node $V_B$, the switching period can be divided into four successive intervals, namely a first interval 302, a second interval 304, a third interval 306 and a fourth interval 308 as shown in FIG. 3.

FIG. 3 further illustrates the gate drive signals for the primary side switches in accordance with various embodiments of the present disclosure. As shown in FIG. 3, Q5 and Q6 receive complementary gate drive signals. In addition, Q5 and Q6 have a nearly 50% duty cycle. Q1 and Q3 receive complementary gate drive signals. Likewise, Q2 and Q4 receive complementary gate drive signals. Q1 and Q2 are of the same duty cycle, which is utilized to control the amplitude of the output voltage Vo. It should be noted that Q1 and Q2 are of the same duty cycle, but there is a phase shift between Q1's turn-on and Q2's turn-on. As shown in FIG. 3, Q1 is turned on during a first half period. In contrast, Q2 is turned on during a second half period.

Based upon the power topology and gate drive signals shown in FIG. 3, the output voltage of the multilevel LLC resonant converter may be described as follows:

$$\frac{V_0}{V_{IN}} = \frac{(1+2D)}{2}$$

where D is in a range from about 0 to about 0.5 and Vo is in a range from about one half of Vin to about Vin.

LLC resonant converter may achieve zero voltage switching as well as zero current switching when the operating frequency of LLC resonant converters is close to the resonant frequency. However, in a conventional LLC resonant converter, the output voltage V0 is regulated through adjusting the operating frequency of the LLC resonant converter. When the input voltage varies in a wide range (e.g., 36V to 75V for a telecommunication application), the efficiency of the LLC resonant converter may suffer because the operating frequency is not at the resonant frequency.

One advantageous feature of the multilevel LLC resonant converter shown in FIG. 3 is that the output voltage V0 can be regulated through adjusting the duty cycle. As a result, the multilevel LLC resonant converter may operate at a frequency close to the resonant frequency. As such, the multilevel LLC resonant converter can achieve zero voltage switching (ZVS) for the primary side switches and zero current switching (ZCS) for the secondary side switches. The soft switching operation (e.g., ZVS and ZCS) helps to achieve high efficiency.

The multilevel LLC resonant converter shown in FIG. 3 operates at a frequency approximately equal to the resonant frequency of the resonant tank. However, the multilevel LLC resonant converter shown in FIG. 3 also supports a variable frequency operation. For example, in response to a voltage drop at the input power source, the multilevel LLC resonant converter may lower its operating frequency slightly to increase the voltage gain so that the output can maintain a regulated output voltage V0. The frequency adjustment can be implemented by using a feed forward control scheme. The detailed description of the feed forward control scheme will be illustrated below with respect to FIG. 9 and FIG. 10.

FIGS. 4-7 illustrate equivalent circuit diagrams of the schematic shown in FIG. 3 during four successive intervals (e.g., intervals 302, 304, 306 and 308 shown in FIG. 3) of a switching period in accordance with various embodiments of the present disclosure.

Figure 4:
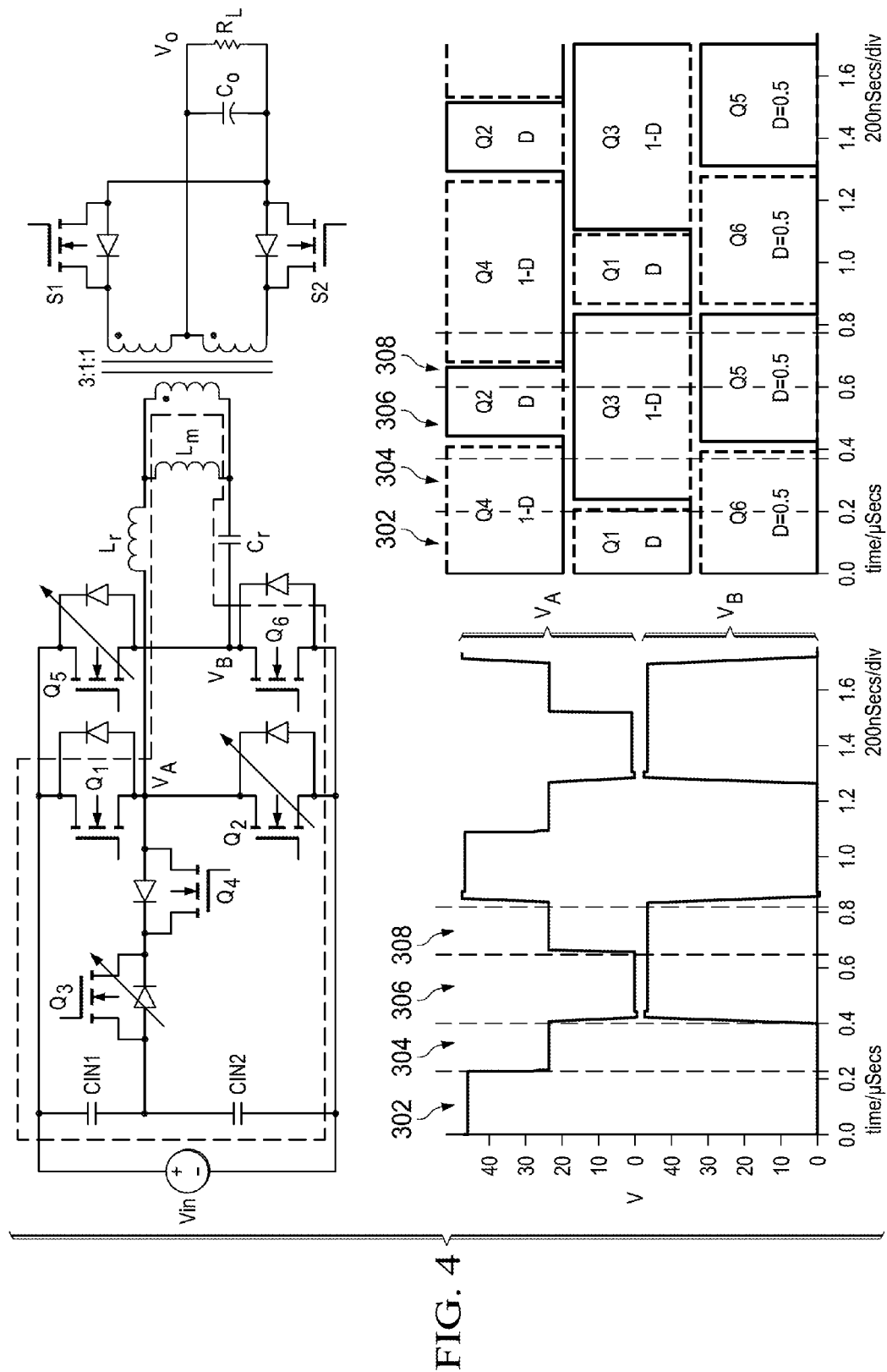
FIG. 4 illustrates an equivalent circuit diagram of the multilevel LLC resonant converter operating in the first interval in accordance with various embodiments of the present disclosure.

FIG. 4 illustrates an equivalent circuit diagram of the multilevel LLC resonant converter operating in the first interval 302 in accordance with various embodiments of the present disclosure. As shown in the gate drive signal waveforms, Q1, Q4 and Q6 are turned on. Q2, Q2 and Q5 are turned off. As a result, the input power source Vin charges the inductor Lr and delivers energy from the primary side to the secondary side of the transformer through a conductive path formed by Q1, Lr, Cr and Q6.

In FIG. 4, the dashed line indicates the conductive path during the first interval 302. It should be noted that the black arrows placed on top of the components of FIG. 4 indicate such components are disabled during this interval of the operation of the multilevel LLC resonant converter. It should further be noted that the turn-on of Q4 is optional. During the first internal 302, the turn-on of Q4 cannot establish a conductive path because Q3 is turned off. As such, Q4 can be either in a turn-on state or in a turn-off state. In order to reduce switching losses, Q4 remains the on state of the previous interval.

The switching waveforms illustrate the voltages at node VA and node VB respectively. Because Q1 is turned on, node A is tied to Vin directly. For a 48V input telecommunication power supply, the voltage at node A is approximately equal to 48V. Likewise, node B is tied to ground because Q6 is turned on. The gate drive waveforms show during the first interval 302, Q1 is turned on and the duration of Q1's turn-on is defined as D. Q5 and Q6 are operated in complementary mode and with equal duty cycle. In other words, Q5 and Q6 are of approximately 50% duty cycle but 180 degrees out of phase.

One advantageous feature of having the gate drive signals shown in FIG. 4 is that the multi-level LLC resonant converter is of both the feature of multi-level converters and the feature of conventional full bridge converters. By controlling the duty cycle of Q1, the voltage at node $V_A$ is adjusted so that the multi-level PWM control is achieved. On the other hand, the voltage at node $V_B$ is similar to that of conventional full bridge converters.

Figure 5:
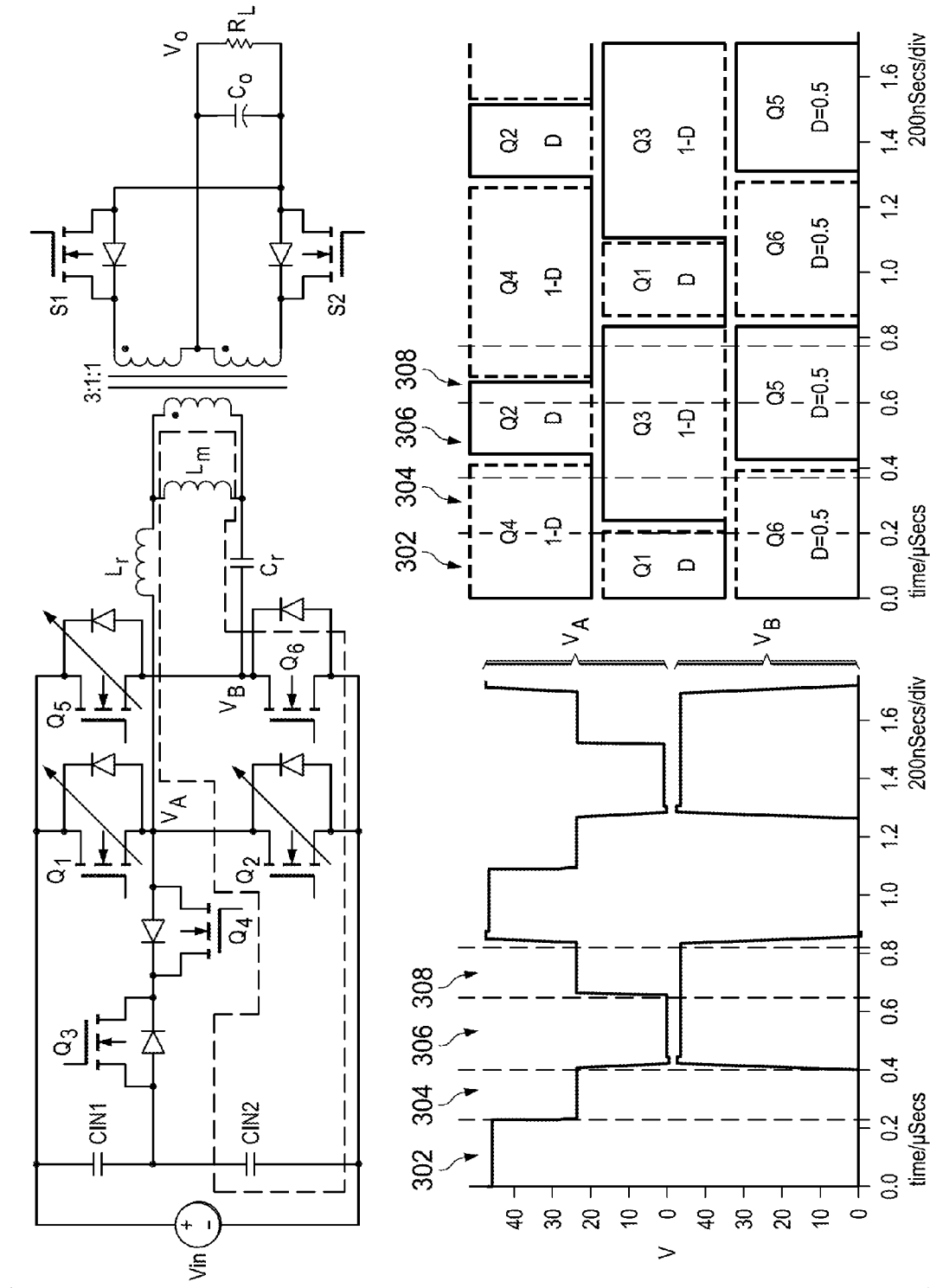
FIG. 5 illustrates an equivalent circuit diagram of the multilevel LLC resonant converter operating in the second interval in accordance with various embodiments of the present disclosure.

FIG. 5 illustrates an equivalent circuit diagram of the multilevel LLC resonant converter operating in the second interval 304 in accordance with various embodiments of the present disclosure. As indicated by the gate drive signals during the second interval 304, Q3, Q4 and Q6 are turned on. Q1, Q2 and Q5 are turned off. As a result, the input source Vin keeps charging the inductor Lr and delivering energy from the primary side to the secondary side through a conductive path formed by Q3, Q4, Lr, Cr and Q6. It should be noted that when switching elements Q3 and Q4 are turned on, node $V_A$ is coupled to the mid point voltage, which is equal to one half of the voltage of the input power source Vin.

In FIG. 5, the dashed line indicates the conductive path during the second interval 304. It should be noted that the black arrows placed on top of the components of FIG. 5 indicate such components are disabled during this interval of the operation of the multi-level LLC resonant converter.

The switching waveforms illustrate the voltages at node $V_A$ and node $V_B$ respectively. Because Q3 and Q4 are turned on, node $V_A$ is tied to the mid point voltage, which is equal to one half of the input power source Vin. For a 48V input telecommunication power supply, the voltage at node $V_A$ is approximately equal to 24V Likewise, node $V_B$ is tied to ground because Q6 is turned on. The gate drive waveforms show during the second interval 304, Q1 is turned off and Q3 and Q4 are turned.

Figure 6:
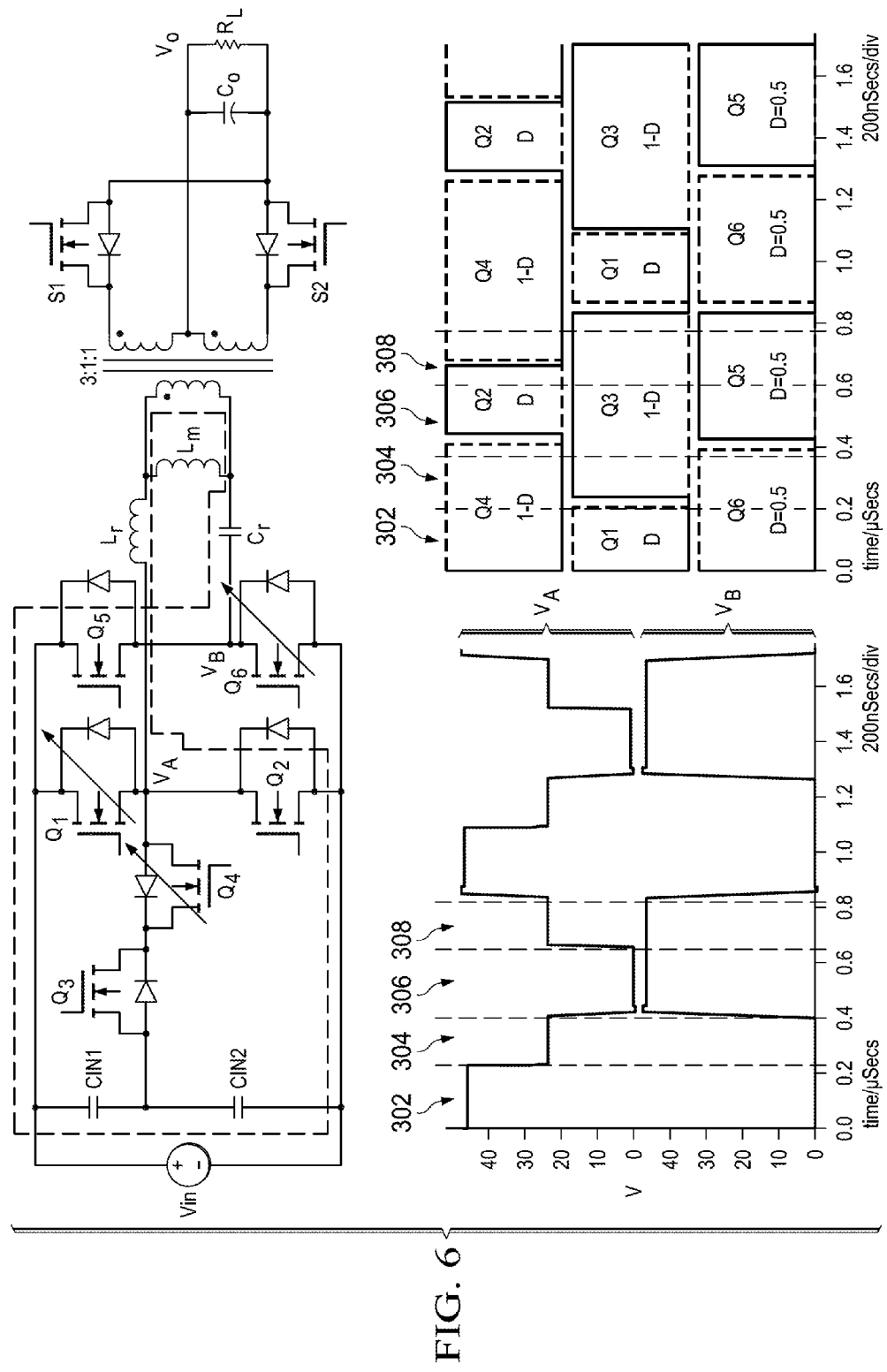
FIG. 6 illustrates an equivalent circuit diagram of the multilevel LLC resonant converter operating in the third interval in accordance with various embodiments of the present disclosure.

FIG. 6 illustrates an equivalent circuit diagram of the multilevel LLC resonant converter operating in the third interval 306 in accordance with various embodiments of the present disclosure. As indicated by the gate drive signals during the third interval 306, Q2, Q3 and Q5 are turned on. Q1, Q4 and Q6 are turned off. As a result, the inductor Lr is discharged and reset by the negative voltage across node $V_A$ and node $V_B$. The operation of this portion is similar to the second half cycle of a convention full bridge converter, and hence is not discussed in detail herein.

The energy is delivered from the primary side to the secondary side through a conductive path formed by Q2, Lr, Cr and Q5. In FIG. 6, the dashed line indicates the conductive path during the third interval 306. It should be noted that the black arrows placed on top of the components of FIG. 6 indicate such components are disabled during this phase of the operation of the multilevel LLC resonant converter.

The switching waveforms illustrate the voltages at node $V_A$ and node $V_B$ respectively. Because Q2 is turned on, node $V_A$ is tied to ground directly. For a 48V input telecommunication power supply, the voltage at node $V_A$ is approximately equal to 0V. Likewise, node $V_B$ is tied to Vin because Q5 is turned on. The voltage at node $V_B$ is approximately equal to 48V. The gate drive waveforms show during the third interval 306, Q2 is turned on and the duration of Q2's turn-on is defined as D, which is similar to the D of the first half cycle (D of Q1). Q5 and Q6 are operated in complementary mode and with equal duty cycle. In this mode, Q5 is turned on and Q6 is turned off.

Figure 7:
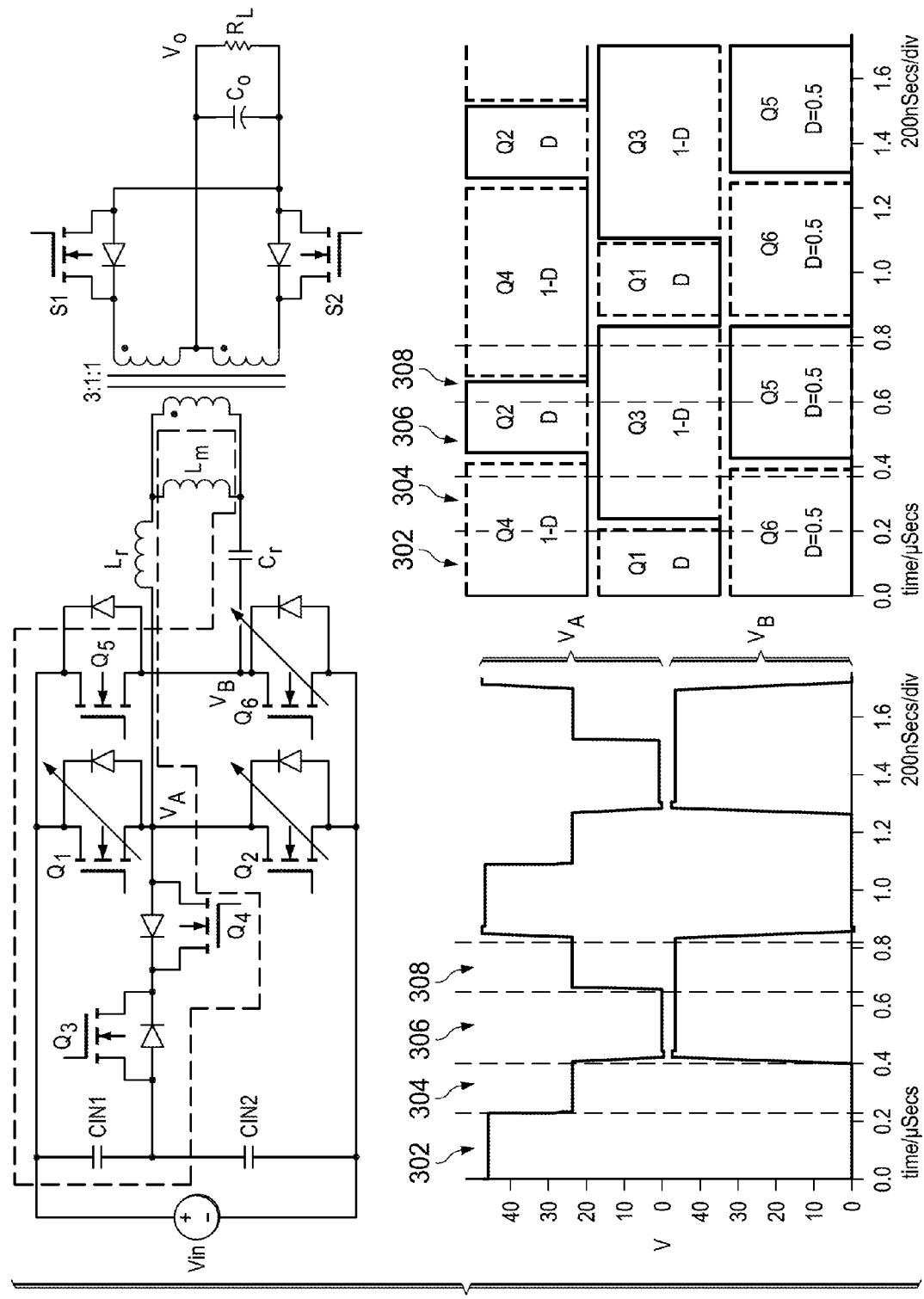
FIG. 7 illustrates an equivalent circuit diagram of the multilevel LLC resonant converter operating in the fourth interval in accordance with various embodiments of the present disclosure.

FIG. 7 illustrates an equivalent circuit diagram of the multilevel LLC resonant converter operating in the fourth interval 308 in accordance with various embodiments of the present disclosure. As indicated by the gate drive signals during the fourth interval 308, Q3, Q4 and Q5 are turned on. Q1, Q2 and Q6 are turned off. As a result, the inductor Lr is discharged and reset by the negative voltage across node $V_A$ and node $V_B$. It should be noted that when switching elements Q3 and Q4 are turned on, node $V_A$ is coupled to the mid voltage point, which is equal to one half of the voltage of the input power source Vin.

In FIG. 7, the dashed line indicates the conductive path during the fourth interval 308. It should be noted that the black arrows placed on top of the components of FIG. 7 indicate such components are disabled during this phase of the operation of the multi-level LLC resonant converter.

The switching waveforms illustrate the voltages at node $V_A$ and node $V_B$ respectively. Because Q3 and Q4 are turned on, node $V_A$ is tied to a voltage approximately equal to one half of Vin. For a 48V input telecommunication power supply, the voltage at node $V_A$ is approximately equal to 24V. Likewise, node $V_B$ is tied to Vin because Q5 is turned on. The gate drive waveforms show during the fourth interval 308, Q5 is turned off and Q3 and Q4 are turned on.

Figure 8A:
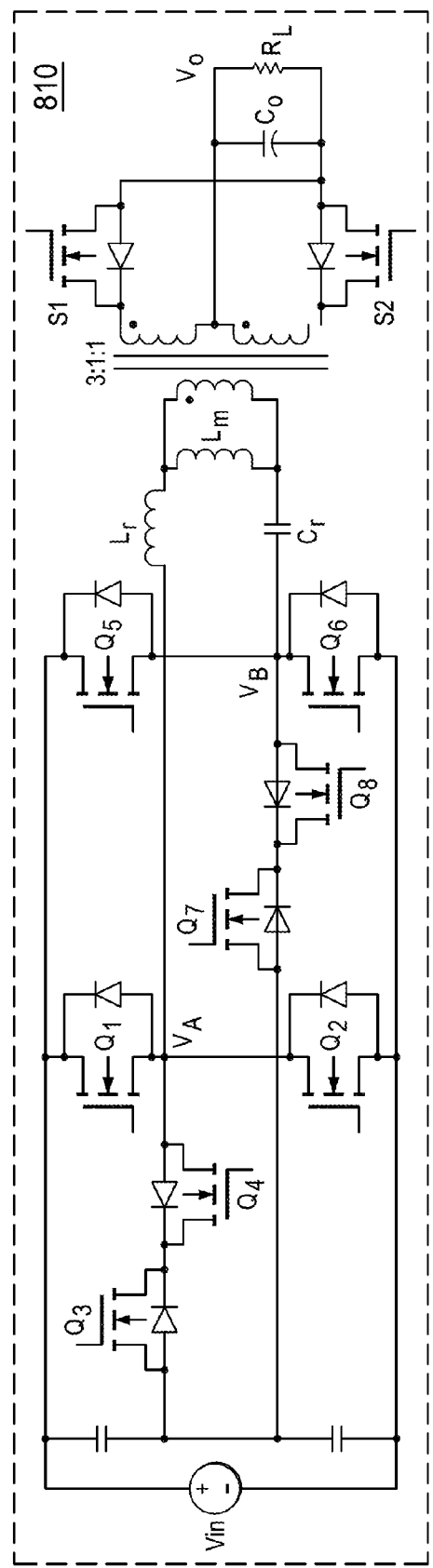
FIGS. 8A-8C illustrate a plurality of multi-level LLC converters in accordance with various embodiments of the present disclosure.
Figure 8B:
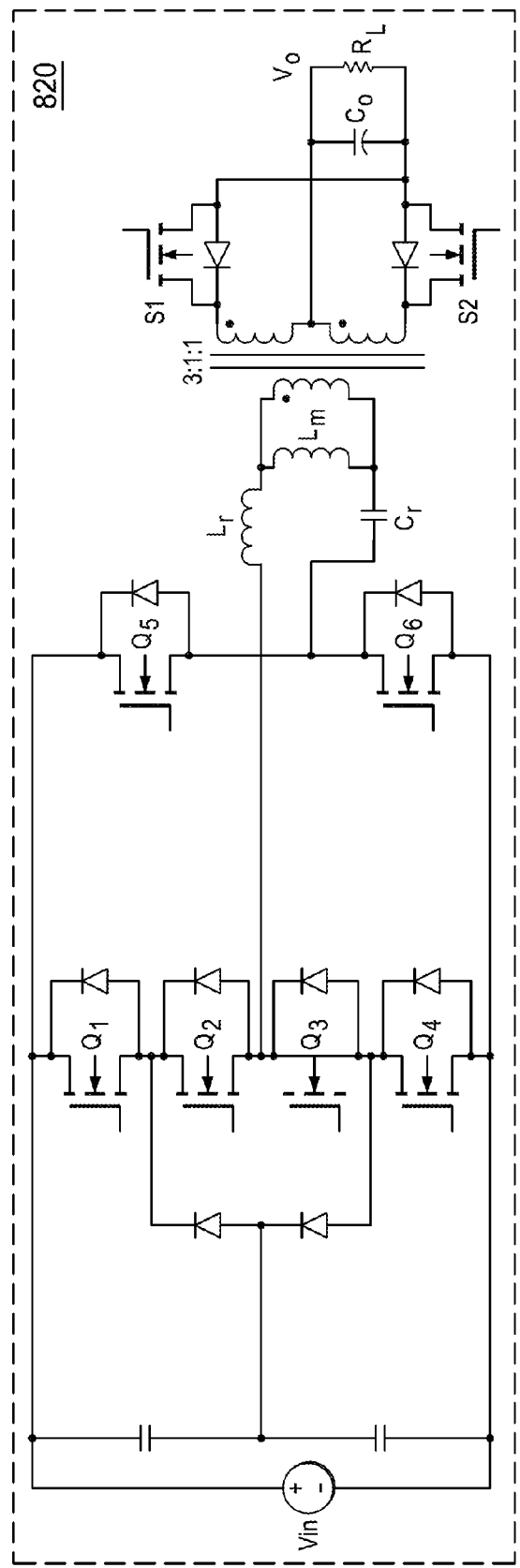
Figure 8C:
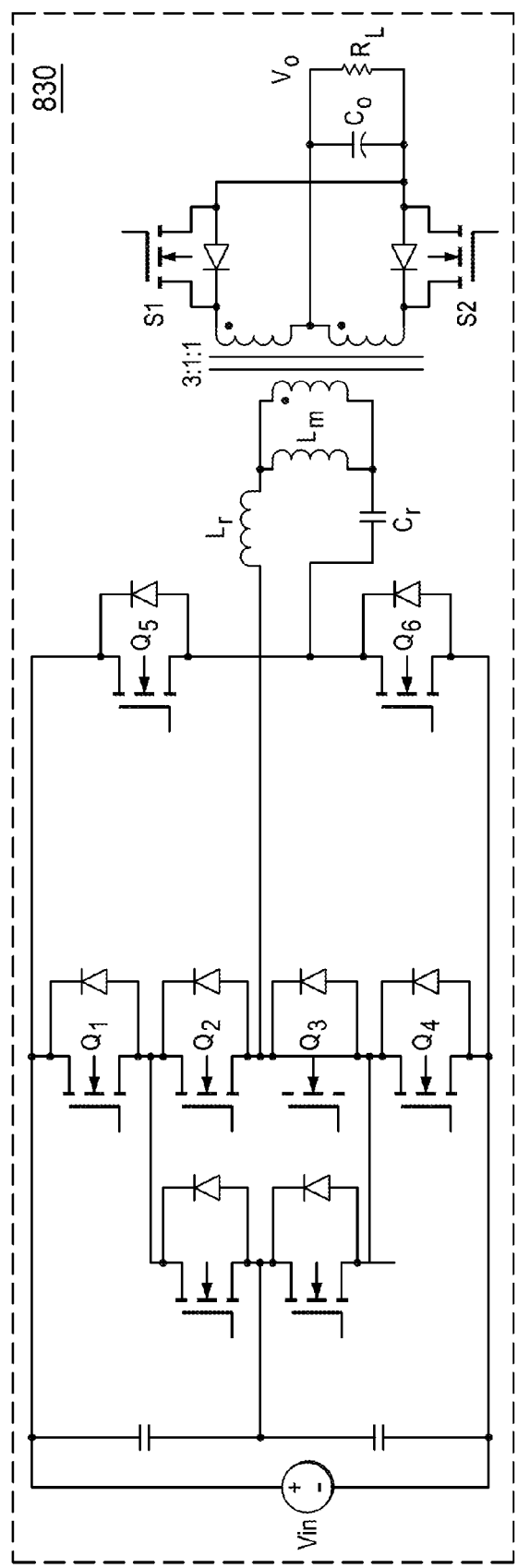

FIGS. 8A-8C illustrate a plurality of multilevel LLC resonant converters in accordance with various embodiments of the present disclosure. The multilevel LLC resonant converter 810 is similar to the multilevel LLC resonant converter shown in FIG. 3 except that there is a second isolation switch coupled between node $V_B$ and the mid voltage node. The second isolation switch is formed by back-to-back connected switches Q7 and Q8.

One advantageous feature of having the second isolation switch is that the multi-level LLC resonant converter 810 is of a wider output voltage range in comparison with the multilevel LLC resonant converter shown in FIG. 3. As described above with respect to FIG. 3, the multilevel LLC resonant converter controls its output voltage through adjusting the duty cycle of Q1. In other words, there is one adjustable parameter for controlling the output voltage. In contrast, the multilevel LLC resonant converter 810 is of two adjustable parameters. One is the turn-on time of Q1, which is defined as D1 and the other is the turn-on time of Q5, which is defined as D2.

In accordance with an embodiment, the relationship between the input and output voltages may be described as follows:

$$\frac{V_0}{V_{IN}} = 2D1 + D2$$

As shown in the equation above, the ratio of Vo to VIN is in a range from 0 to 1 if suitable D1 and D2 are selected.

The multilevel LLC resonant converter 820 is similar to the multilevel LLC converter shown in FIG. 3 except that the multilevel LLC resonant converter 820 is a diode clamped multilevel converter. The operational principles of diode clamped multilevel converters are well known, and hence are not discussed in further detail herein to avoid unnecessary repetition.

The multilevel LLC resonant converter 830 is similar to the multilevel LLC resonant converter 820 except that the clamping diodes are replaced by controllable switches. The operational principles of multilevel LLC resonant converter 830 are similar to the operational principles of the multilevel resonant converter 820, and hence are not discussed in further detail herein to avoid unnecessary repetition.

Figure 9:
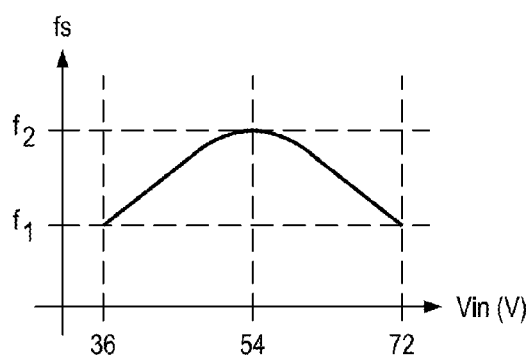
FIG. 9 illustrates a control mechanism of the multilevel LLC resonant converter in accordance with various embodiments of the present disclosure.

FIG. 9 illustrates a control mechanism of the multilevel LLC resonant converter in accordance with various embodiments of the present disclosure. In a telecommunication system, the input voltage of a multilevel LLC resonant converter may vary from about 36V to about 72V. In response to the variation of the input voltage, the switching frequency changes accordingly. More particularly, an input voltage and its corresponding switching frequency may be stored in a lookup table. Once the multilevel LLC resonant converter detects a voltage change at its input, the switching frequency may change based upon the information stored in the lookup table. FIG. 9 illustrates an example. At a normal input voltage such as 54V, the switching frequency is set to around $f_2$. On the other hand, at either a low input line such as 36V or a high input line such as 72V, the switching frequency is set to around $f_1$. As shown in FIG. 9, $f_2$ is higher than $f_1$.

It should be noted that the curve shown in FIG. 9 is merely an example, which should not unduly limit the scope of the claims. Depending on different applications and design needs, one of ordinary skill in the art would recognize many variations, alternatives, and modifications.

Figure 10:
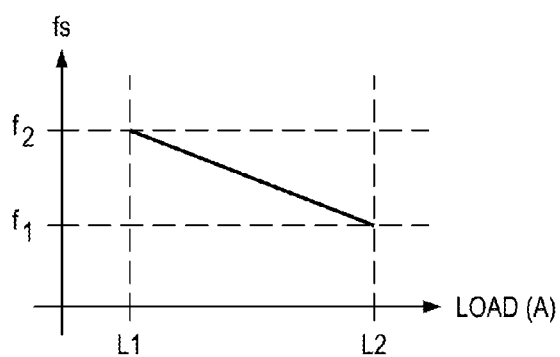
FIG. 10 illustrates another control mechanism of the multilevel LLC resonant converter in accordance with various embodiments of the present disclosure.

FIG. 10 illustrates another control mechanism of the multilevel LLC resonant converter in accordance with various embodiments of the present disclosure. The control mechanism shown in FIG. 10 is similar to the control mechanism shown in FIG. 9 except that the switching frequency is adjustable based upon the load of the multilevel LLC resonant converter.

Figure 11:
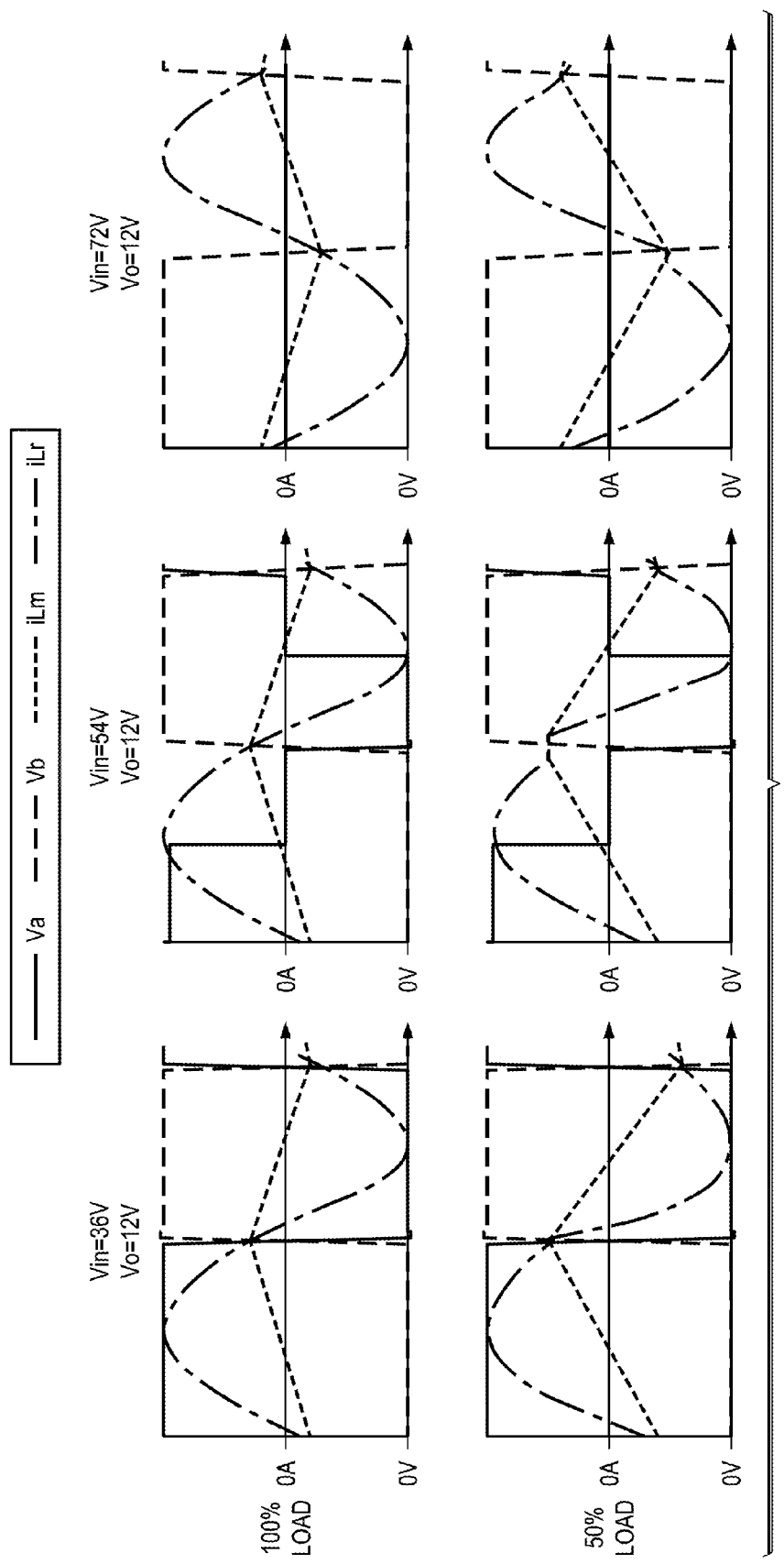
FIG. 11 illustrates key waveforms of the multilevel LLC resonant converter shown in FIG. 3 in accordance with various embodiments of the present disclosure.

FIG. 11 illustrates key waveforms of the multilevel LLC resonant converter shown in FIG. 3 in accordance with various embodiments of the present disclosure. As shown in FIG. 11, under different input lines such as 36V, 54V and 72V and different loads such as full load and half load, the multilevel LLC resonant converter may achieve zero voltage switching for the primary side switches and zero voltage switching for the secondary side switches.

As shown in FIG. 11, the switching frequency may vary in response to different input lines. By employing slightly different switching frequency, the multilevel LLC resonant converter may achieve higher efficiency.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
a first capacitor and a second capacitor connected in series providing a mid-voltage point of an input dc power source;
a resonant tank connected in series with a primary side of a transformer;
a first switch and a second switch connected in series, wherein a common node of the first switch and the second switch is coupled to:
the mid-voltage point through a first isolation switch; and
the resonant tank; and
a third switch and a fourth switch connected in series, wherein a common node of the third switch and the fourth switch is coupled to the resonant tank.

2. The apparatus of claim 1, wherein:
the resonant tank comprises an inductor and a capacitor.

3. The apparatus of claim 1, wherein:
the first isolation switch comprises two back-to-back connected switches.

4. The apparatus of claim 1, wherein:
the mid-voltage point is a common node of the first capacitor and the second capacitor connected in series across the input dc power source.

5. The apparatus of claim 1, further comprising:
a second isolation switch coupled between the mid-voltage point and the common node of the third switch and the fourth switch.

6. The apparatus of claim 1, further comprising:
a synchronous rectifier coupled to a secondary side of the transformer; and
an output filter coupled to the synchronous rectifier.

7. The apparatus of claim 1, wherein:
the third switch and the fourth switch are controlled by complementary gate drive signals, and wherein the third switch and the fourth switch have a nearly 50% duty cycle.

8. A system comprising:
an input power source;
a first capacitor and a second capacitor connected in series across the input power source;
a first pair of switches coupled between the input power source, wherein a common node of the first pair of switches is coupled to a common node of the first capacitor and the second capacitor through a first isolation switch;
a second pair of switches coupled between the input power source;
a resonant tank connected in series with a primary side of a transformer to form a resonant network, wherein:
the common node of the first pair of switches is coupled to a first terminal of the resonant network; and
a common node of the second pair of switches is coupled to a second terminal of the resonant network;
a synchronous rectifier coupled to a secondary side of the transformer; and
an output filter coupled to the synchronous rectifier.

9. The system of claim 8, wherein the resonant network comprises:
a resonant inductor connected in series with a primary winding of the transformer;
a resonant capacitor connected in series with the primary winding of the transformer; and
a magnetizing inductor connected in parallel with the primary winding of the transformer.

10. The system of claim 8, wherein the synchronous rectifier comprises:
a first switch coupled between a first terminal of the secondary side of the transformer and ground; and
a second switch coupled between a second terminal of the secondary side of the transformer and ground.

11. The system of claim 10, wherein the output filter is capacitor coupled between a mid-point of the second side of the transformer and ground.

12. The system of claim 8, further comprising:
a second isolation switch coupled between common node of the first capacitor and the second capacitor and the common node of the second pair of switches.

13. The system of claim 12, wherein:
the second isolation switch comprises two back-to-back connected switches.

14. The system of claim 8, wherein:
the first isolation switch comprises two back-to-back connected switches.

15. A method comprising:
during a first time duration, coupling a first input of a resonant network to a positive terminal of an input power source and a second input of the resonant network to a negative terminal of the input power source;
during a second time duration, coupling the first input of the resonant network to a common node of two capacitors coupled between the input power source and the second input of the resonant network to the negative terminal of the input power source;
during a third time duration, coupling the first input of the resonant network to the negative terminal of the input power source and the second input of the resonant network to the positive terminal of the input power source; and
during a fourth time duration, coupling the first input of the resonant network to the common node of the two capacitors coupled between the input power source and the second input of the resonant network to the positive terminal of the input power source.

16. The method of claim 15, wherein:
a switching frequency of a period formed by the first time duration, the second time duration, the third time duration and the fourth time duration is approximately equal to a resonant frequency of the resonant network.

17. The method of claim 15, wherein:
the resonant network comprising a resonant inductor, a resonant capacitor and a magnetizing inductor of a transformer.

18. The method of claim 17, wherein:
the resonant inductor connected in series with a primary winding of the transformer;
the resonant capacitor connected in series with the primary winding of the transformer; and
the magnetizing inductor connected in parallel with the primary winding of the transformer.

19. The method of claim 15, further comprising:
coupling the first input of the resonant network to the common node of two capacitors coupled between the input power source through a first isolation switch, wherein the first isolation switch comprises two back-to-back connected switching elements.

20. The method of claim 19, further comprising:
coupling the first input of the resonant network to the common node of the two capacitors coupled between the input power source through the first isolation switch.

* * * * *